United States Patent
Jiang et al.

(10) Patent No.: US 11,769,005 B2
(45) Date of Patent: Sep. 26, 2023

(54) INFORMATION UNIQUENESS ASSESSMENT USING STRING-BASED COLLECTION FREQUENCY

(71) Applicant: EMC IP Holding Company LLC, Hopkinton, MA (US)

(72) Inventors: Shou-Huey Jiang, Durham, NC (US); Wenjin Liu, Cary, NC (US); Chao Su, Cary, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 221 days.

(21) Appl. No.: 16/887,046

(22) Filed: May 29, 2020

(65) Prior Publication Data

US 2021/0374336 A1 Dec. 2, 2021

(51) Int. Cl.
*G06F 40/205* (2020.01)
*G06F 40/284* (2020.01)
*G06N 5/04* (2023.01)
*G06F 21/62* (2013.01)
*G06V 30/262* (2022.01)

(52) U.S. Cl.
CPC ........ *G06F 40/205* (2020.01); *G06F 21/6254* (2013.01); *G06F 40/284* (2020.01); *G06N 5/04* (2013.01); *G06V 30/274* (2022.01)

(58) Field of Classification Search
CPC .. G06F 40/205; G06F 21/6254; G06F 40/284; G06F 40/166; G06F 40/30; G06N 5/04; G06V 30/274
See application file for complete search history.

(56) References Cited

U.S. PATENT DOCUMENTS

| | | | |
|---|---|---|---|
| 8,862,534 B1* | 10/2014 | Faratin | G06F 16/313 706/50 |
| 9,116,982 B1* | 8/2015 | Stern | G06F 16/288 |
| 9,442,905 B1* | 9/2016 | Kawaguchi | G06F 16/951 |

(Continued)

OTHER PUBLICATIONS https://www.geeksforgeeks.org/determine-string-unique-characters/, downloaded on May 22, 2020.

(Continued)

*Primary Examiner* — Ibrahim Siddo
(74) *Attorney, Agent, or Firm* — Ryan, Mason & Lewis, LLP (57) ABSTRACT

Techniques are provided for assessing uniqueness of information using string-based collection frequency techniques. One method comprises obtaining multiple collections of documents from at least one data source; determining a collection frequency for a given character string based on a number of the collections comprising the given character string relative to a total number of the collections; assigning a uniqueness rating to the given character string based at least in part on a comparison of the collection frequency of the given character string to a collection frequency of one or more additional character strings in one or more of the plurality of collections; and performing an automated action using the given character string based on the assigned uniqueness rating. The automated action may comprise protecting the given character string and/or identifying the given character string as important information satisfying one or more importance criteria.

20 Claims, 6 Drawing Sheets

(56) References Cited

U.S. PATENT DOCUMENTS

| | | | |
|---|---|---|---|
| 9,767,165 B1* | 9/2017 | Tacchi | G06F 16/9535 |
| 10,032,046 B1* | 7/2018 | Hayashi | H04L 63/0245 |
| 2010/0278453 A1* | 11/2010 | King | G06F 40/197 |
| | | | 715/230 |
| 2011/0191673 A1* | 8/2011 | Ikawa | G06F 3/14 |
| | | | 715/273 |
| 2015/0055155 A1* | 2/2015 | Amano | G06F 3/1222 |
| | | | 358/1.11 |
| 2015/0169562 A1* | 6/2015 | Connor | G06F 16/93 |
| | | | 707/723 |
| 2015/0169573 A1* | 6/2015 | Arora | G06F 16/248 |
| | | | 707/E17.084 |
| 2016/0342589 A1* | 11/2016 | Brugger | G06F 16/35 |
| 2017/0061025 A1* | 3/2017 | Arora | G06F 16/24578 |
| 2017/0169251 A1* | 6/2017 | Lewin-Eytan | H04L 51/28 |
| 2019/0325020 A1* | 10/2019 | Catalano | G06F 40/20 |
| 2020/0210648 A1* | 7/2020 | Comeau | G06F 16/3331 |

OTHER PUBLICATIONS https://javahungry.blogspot.com/2014/11/string-has-all-unique-characters-java-example.html, downloaded on May 22, 2020.

https://www.guru99.com/java-strings.html, downloaded on May 22, 2020.

* cited by examiner

COMPANY-A:
    SYSTEM-123:
        MESSAGE: SYSTEM-123 IN COMPANY-A IS GOOD.
        MESSAGE: SYSTEM-123 IN COMPANY-A IS BAD.
        MESSAGE: SYSTEM-123 IN COMPANY-A IS GOOD.
        MESSAGE: SYSTEM-123 IN COMPANY-A IS BAD.
        MESSAGE: SYSTEM-123 IN COMPANY-A IS GOOD.
        MESSAGE: SYSTEM-123 IN COMPANY-A IS BAD.
    SYSTEM-124:
        MESSAGE: SYSTEM-124 IN COMPANY-A IS GOOD.
        MESSAGE: SYSTEM-124 IN COMPANY-A IS BAD.
        MESSAGE: SYSTEM-124 IN COMPANY-A IS GOOD.
        MESSAGE: SYSTEM-124 IN COMPANY-A IS BAD.
COMPANY-B:
    SYSTEM-ABC:
        MESSAGE: SYSTEM-ABC IN COMPANY-B IS GOOD.
        MESSAGE: SYSTEM-ABC IN COMPANY-B IS BAD.
    SYSTEM-XYZ:
        MESSAGE: SYSTEM-XYZ IN COMPANY-B IS GOOD.
        MESSAGE: SYSTEM-XYZ IN COMPANY-B IS BAD.

INFORMATION UNIQUENESS ASSESSMENT USING STRING-BASED COLLECTION FREQUENCY

FIELD

The field relates generally to information processing, and more particularly, to techniques for processing document collections.

BACKGROUND

Entities, such as companies, company systems and system components, often have large collections of associated documents (e.g., word processing documents, logs and/or messages). Different entities often have different collections of associated documents. A need exists for techniques for identifying information in such collections of documents that is unique, potentially important and/or sensitive for a given entity.

SUMMARY

In one embodiment, a method comprises obtaining a plurality of collections of documents from at least one data source; determining a collection frequency for a given character string based at least in part on a number of the collections comprising the given character string relative to a total number of the collections in the plurality of collections; assigning a uniqueness rating to the given character string based at least in part on a comparison of the collection frequency of the given character string to a collection frequency of one or more additional character strings in one or more of the plurality of collections; and performing at least one automated action using the given character string based at least in part on the assigned uniqueness rating.

In some embodiments, the at least one automated action may comprise protecting the given character string and/or identifying the given character string as important information satisfying one or more importance criteria. The given character string may be protected, for example, by: (i) anonymizing the given character string in response to the given character string satisfying one or more uniqueness criteria, and/or (ii) preventing a disclosure of the given character string in response to the given character string satisfying one or more uniqueness criteria.

In one or more embodiments, the uniqueness rating is determined for one or more of a plurality of levels of the collections of documents and the collection frequency is evaluated for a particular level of the plurality of levels. The uniqueness rating of the given character string may be assessed, for example, by ranking the collection frequency of the given character string and the collection frequency of the one or more additional character strings in one or more of the plurality of collections of documents.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for assessing uniqueness of information using string-based collection frequency techniques.

In one or more embodiments, string-based collection frequency techniques are provided that characterize the uniqueness of a string to an entity represented by one or more collections of documents, compared to other entities represented by other collections of documents. The uniqueness assessment can be used in some embodiments, for example, to characterize potentially important and/or sensitive information for a given entity.

In some embodiments, a collection frequency for a given string can be expressed as a number of the collections comprising the given string relative to a total number of the collections in the plurality of collections, as discussed further below. In at least some embodiments, the uniqueness of a string may be expressed by assigning a defined uniqueness rating to a given string by comparing the collection frequency of the given string to a collection frequency of one or more additional strings in one or more of the plurality of collections. The defined uniqueness rating may be expressed, for example, as a uniqueness category (e.g., two or more categories ranging from unique to common), a uniqueness score (for example, in a range of 0-100), and a uniqueness ranking (e.g., ranked from more to less unique).

The disclosed string-based collection frequency techniques are examples of natural language processing (NLP) techniques. Existing NLP techniques comprise, for example, term frequency-inverse document frequency (TF-IDF) techniques that are widely used to process documents. TF-IDF techniques are often used, for example, to characterize the importance of a word to a document in a collection or a corpus.

In at least some embodiments, different collections of documents may comprise different views of a larger data set (e.g., a data lake) based on (i) a specified entity level, (ii) one or more filtering criteria (e.g., all documents including specified search terms can be considered a collection) and/or (iii) one or more document-clustering criteria (e.g., all documents of a given document category or topic can be considered a collection). As discussed hereinafter, a "collection frequency" can be calculated at any desired collection level (e.g., a company level, a system level and/or a sub-system level).

In some embodiments, the disclosed string-based collection frequency techniques automatically identify dynamic, unique, potentially important and/or sensitive information from documents at a desired collection level, as discussed further below in conjunction with FIG. 2. Common information contained in a collection of documents is often not of interest, while unique information could be rather useful, potentially important and/or sensitive. The disclosed string-based collection frequency methods may be employed to identify such unique information. For example, in at least some embodiments, the disclosed string-based collection frequency methods may be employed to identify potentially sensitive customer information contained in large amounts of data for special treatment (e.g., anonymization or prevention of disclosure).

In some embodiments, one or more strings may be anonymized when the assigned uniqueness rating for the respective string satisfies one or more predefined uniqueness criteria (the predefined uniqueness criteria may be based, for example, on a ranking of the assigned uniqueness ratings and/or indicators that a given string comprises personally identifiable information). Likewise, a disclosure of one or more strings may be prevented when the assigned uniqueness rating for the respective string satisfies one or more predefined uniqueness criteria (the predefined uniqueness criteria may be based, for example, on a ranking of the assigned uniqueness ratings and/or indicators that a given string comprises sensitive information).

In at least one embodiment, the disclosed string-based collection frequency methods may be employed to identify potentially important information contained in large amounts of data for special treatment. For example, one or more strings may be identified as potentially important information when the assigned uniqueness rating for the respective string satisfies one or more predefined importance criteria based at least in part on the assigned uniqueness rating (for example, based on a ranking of the assigned uniqueness ratings relative to one or more thresholds corresponding to predefined importance categories).

As used herein, the term "string" shall be broadly construed to encompass, for example, one or more sequences of characters, such as letters, numbers, symbols and other characters. For example, a string may comprise a sequence of characters from an ASCII (American Standard Code for Information Interchange) character set, or another character encoding standard. In one variation, a user may specify exclusion criteria indicating one or more defined characters that should not be considered as part of a string.

Figure 1:
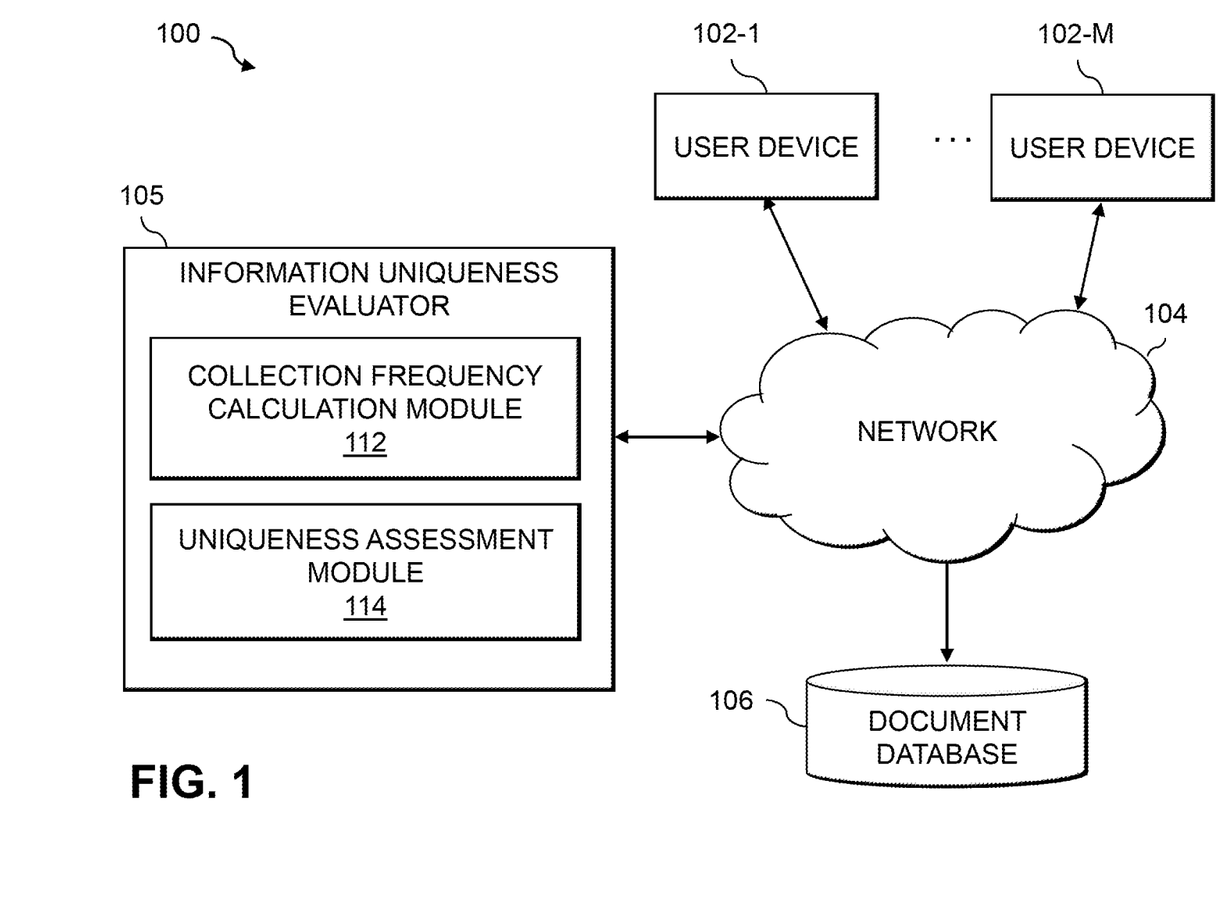
FIG. 1 shows a computer network configured for assessing uniqueness of information using string-based collection frequency techniques in accordance with an illustrative embodiment.

FIG. 1 shows a computer network (also referred to herein as an information processing system) 100 configured in accordance with an illustrative embodiment. The computer network 100 comprises a plurality of user devices 102-1 through 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is an information uniqueness evaluator 105. In some embodiments, the information uniqueness evaluator 105 employs a document database 106, in a manner discussed below.

The user devices 102 may comprise, for example, devices such as mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The information uniqueness evaluator 105 further comprises a collection frequency calculation module 112 and a uniqueness assessment module 114. It is to be appreciated that this particular arrangement of modules 112 and 114 illustrated in the information uniqueness evaluator 105 of the FIG. 1 embodiment is presented by way of example only, and alternative arrangements can be used in other embodiments. For example, the functionality associated with modules 112 and 114 in other embodiments can be combined into a single module, or separated across a larger number of modules. As another example, multiple distinct processors can be used to implement different ones of modules 112 and 114 or portions thereof. At least portions of modules 112 and 114 may be implemented at least in part in the form of software that is stored in memory and executed by a processor.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

As noted above, the information uniqueness evaluator 105 can have an associated document database 106 configured to store documents, such as word processing documents, logs and/or messages. As noted above, in at least some embodiments, different collections of documents in the document database 106 may comprise different views of a larger data set (e.g., a data lake) based on (i) a specified entity level, (ii) one or more filtering criteria (e.g., all documents including specified search terms can be considered a collection) or (iii) one or more document-clustering criteria (e.g., all documents of a given document category or topic can be considered a collection).

The document database 106 in the present embodiment is implemented using one or more storage systems associated with the information uniqueness evaluator 105. Such storage systems may comprise any of a variety of different types of storage including network-attached storage (NAS), storage area networks (SANs), direct-attached storage (DAS) and distributed DAS, as well as combinations of these and other storage types, including software-defined storage.

Also associated with the information uniqueness evaluator 105 can be one or more input-output devices, which illustratively comprise keyboards, displays or other types of input-output devices in any combination. Such input-output devices can be used, for example, to support one or more user interfaces to the information uniqueness evaluator 105, as well as to support communication between the information uniqueness evaluator 105, user devices 102 and other related systems and devices not explicitly shown.

The user devices 102 and the information uniqueness evaluator 105 in the FIG. 1 embodiment are assumed to be implemented using at least one processing device. Each such processing device generally comprises at least one processor and an associated memory, and implements one or more functional modules for controlling certain features of the information uniqueness evaluator 105.

More particularly, user devices 102 and information uniqueness evaluator 105 in this embodiment each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

Network interfaces (not shown in FIG. 1) allow the user devices 102 and/or the information uniqueness evaluator 105 to communicate over the network 104 with each other (as well as one or more other networked devices), and illustratively comprises one or more conventional transceivers.

It is to be understood that the particular set of elements shown in FIG. 1 for assessing uniqueness of information using string-based collection frequency techniques is presented by way of illustrative example only, and in other embodiments additional or alternative elements may be used. Thus, another embodiment includes additional or alternative systems, devices and other network entities, as well as different arrangements of modules and other components.

An exemplary process utilizing modules 112 and 114 of an example information uniqueness evaluator 105 in computer network 100 will be described in more detail with reference to the flow diagram of FIG. 4.

Figure 2:
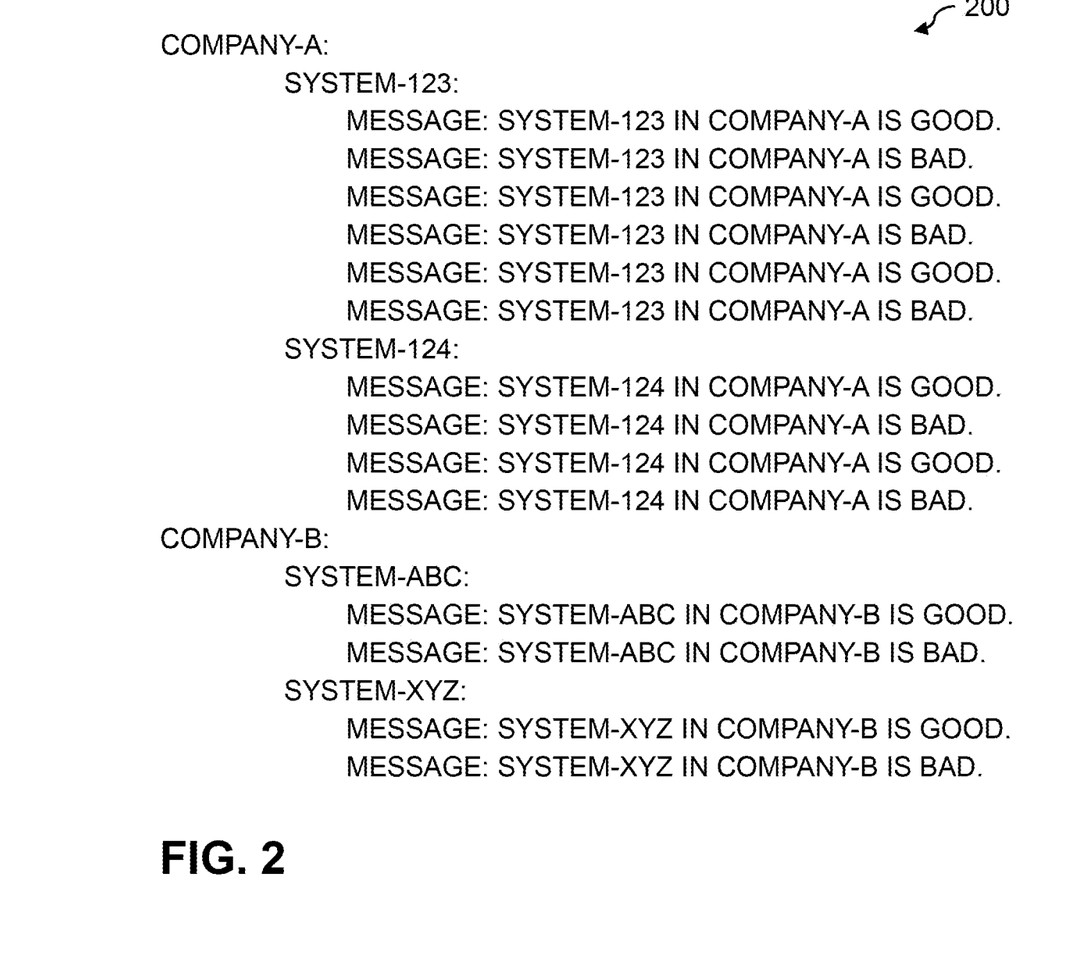
FIG. 2 illustrates exemplary message documents generated by two exemplary systems of two different companies, according to at least one embodiment of the disclosure.

FIG. 2 illustrates exemplary message documents 200 for two different companies, each having two different systems, according to at least one embodiment of the disclosure. As shown in the example of FIG. 2, company-A has six different messages for a system-123 and four different messages for a system-124. Likewise, company-B has two different messages for a system-abc and two different messages for a system-xyz.

As noted above, in at least some embodiments, a collection frequency for a given string can be expressed as a number of the collections comprising the given string relative to a total number of the collections in the plurality of collections. Thus, the collection frequency (CF) may be expressed as follows:

$$CF(s) = \frac{\text{number of collections containing string, } s}{\text{total number of collections}},$$

where the existence of s would be counted as a frequency of "one" in each collection. In other words, it does not matter how many times s appears in one collection, the frequency count is one.

In addition, as noted above, different collections of documents may comprise different views of a larger data set (e.g., a data lake) based on (i) a specified entity level (as discussed further below in conjunction with FIG. 3), (ii) one or more filtering criteria (e.g., all documents including specified search terms can be considered a collection) or (iii) one or more document-clustering criteria (e.g., all documents of a given document category or topic can be considered a collection).

For example, a collection type may include, for example, storage system, storage area network (SAN) switch, collector, cluster, hyperconverged infrastructure (HCI) storage platform and host. The collections may be homogeneous, such as every collection is a storage system; or the collections may be heterogeneous, such as one collection associated with a storage system, another collection associated with a switch, and yet another collection associated with a storage cluster.

For the example message documents 200 of FIG. 2, the collection frequency can be calculated at the system level, as follows:

| total number of systems: 4 collection frequency for each string: | | | |
|---|---|---|---|
| System-123: | 1/4 | System-124: | 1/4 |
| System-abc: | 1/4 | System-xyz: | 1/4 |
| Company-A: | 2/4 | Company-B: | 2/4 |
| good: | 4/4 | bad: | 4/4 |

As shown by the above example, the disclosed string-based collection frequency identifies information that is unique (e.g., system identifiers), information that is less unique (e.g., company identifiers), and information that is common (e.g., "good" and "bad") at the system level.

For the example message documents 200 of FIG. 2, the collection frequency can also be calculated at the company level, as follows:

| total number of companies: 2 collection frequency for each string: | | | |
|---|---|---|---|
| System-123: | 1/2 | System-124: | 1/2 |
| System-abc: | 1/2 | System-xyz: | 1/2 |
| Company-A: | 1/2 | Company-B: | 1/2 |
| good: | 2/2 | bad: | 2/2 |

As shown by the above example, the disclosed string-based collection frequency identifies information that is unique (e.g., system identifiers, and company identifiers), and information that is common (e.g., "good" and "bad") at the company level.

By calculating the collection frequency at different collection levels, in this manner, the dynamics can be identified. Thus, the potential importance and degree of sensitivity of each string can be determined at the desired level.

Figure 3:
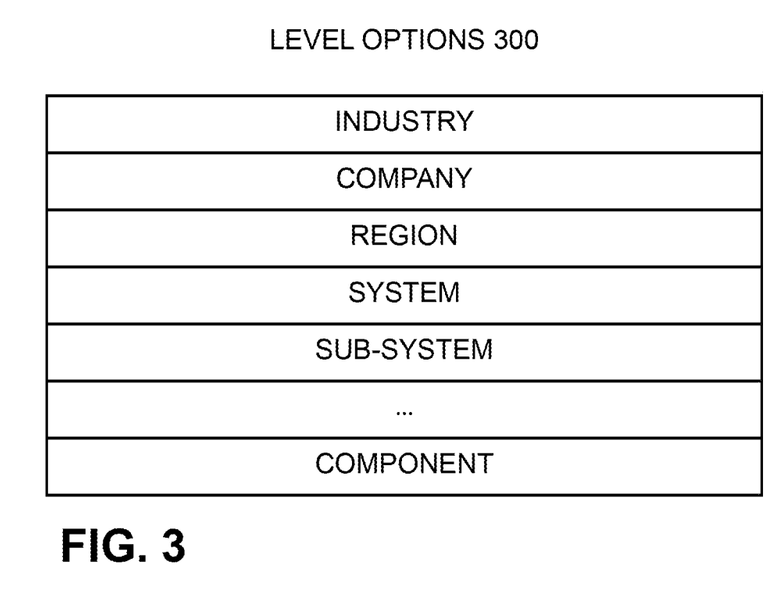
FIG. 3 illustrates an exemplary set of level options that may be selected to define document collections for determining the collection frequency, according to one or more embodiments of the disclosure.

FIG. 3 illustrates an exemplary set of level options 300 that may be selected to define document collections for determining the collection frequency, according to at least one embodiment. As noted above, the collection frequency can be calculated at any desired collection level (e.g., a company level, a system level and/or a sub-system level). In the example of FIG. 3, the exemplary level options 300 comprise an industry level (e.g., to compare document collections of different industries), a company level (e.g., to compare document collections of different companies), a region level (e.g., to compare document collections of different regions within a given company), a system level (e.g., to compare document collections of different systems within a given company), a sub-system level (e.g., to compare document collections of different sub-systems within a given system) and a component level (e.g., to compare document collections of different components within a given sub-system).

Figure 4:
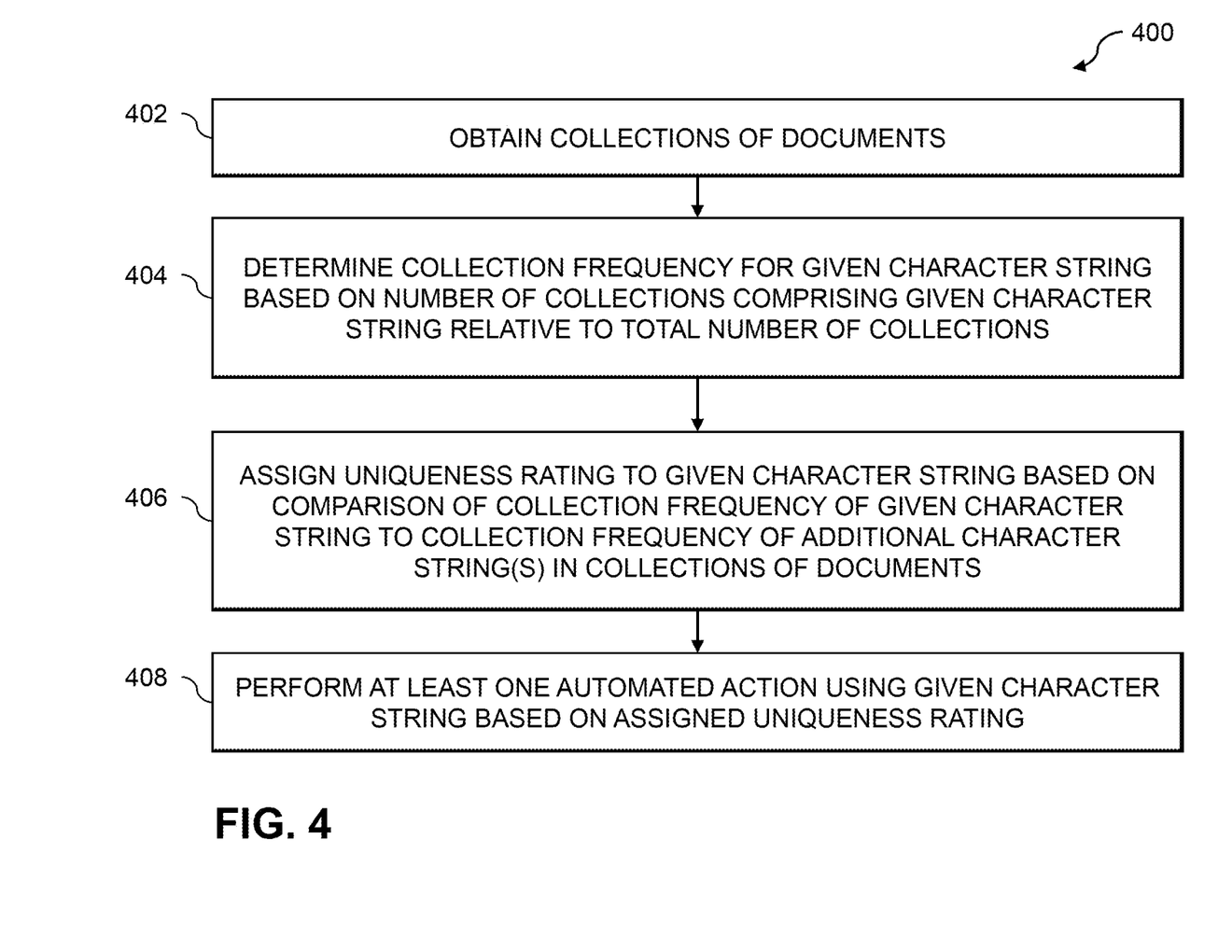
FIG. 4 is a flow chart illustrating an exemplary implementation of an information uniqueness assessment process that uses the disclosed string-based collection frequency techniques, according to some embodiments.

FIG. 4 is a flow chart illustrating an exemplary implementation of an information uniqueness assessment process 400 that uses the disclosed string-based collection frequency techniques, according to some embodiments of the disclosure. As shown in FIG. 4, the exemplary information uniqueness assessment process 400 initially obtains a plurality of collections of documents from a data source during step 402. Thereafter, the information uniqueness assessment process 400 determines a collection frequency for a given string during step 404, based on a number of the collections comprising the given string relative to a total number of the collections in the plurality of collections.

As shown in FIG. 4, the information uniqueness assessment process 400 assigns a uniqueness rating to the given character string during step 406, based on a comparison of the collection frequency of the given string to a collection frequency of one or more additional strings in one or more of the plurality of collections. Finally, the information uniqueness assessment process 400 performs at least one automated action using the given character string during step 408, based at least in part on the assigned uniqueness rating.

In some embodiments, the at least one automated action using the given character string performed during step 408 may protect the given string as sensitive information based at least in part on the assigned uniqueness rating. For example, the sensitive information can be protected by: (i) anonymizing one or more strings satisfying one or more uniqueness criteria, and/or (ii) preventing a disclosure of one or more strings satisfying one or more uniqueness criteria. In another variation, the at least one automated action using the given character string performed during step 408 may identify the given string as important information satisfying one or more importance criteria based at least in part on the assigned uniqueness rating.

As noted above, the uniqueness rating is determined for one or more of a plurality of levels of the collections of documents (e.g., the collection frequency can be evaluated for a particular level of the plurality of levels).

In some embodiments, the uniqueness rating of the given string is assessed by ranking the collection frequency of the given string and the collection frequency of the one or more additional strings in one or more of the plurality of collections of documents.

The information uniqueness assessment process 400 may also provide a notification and/or an alert to one or more of the user devices 102 or another system, for example, by outputting such notification and/or an alert to a user interface and/or transmitting instructions to perform one or more of the automated actions described herein.

In the present embodiment, alerts or notifications generated by, for example, the information uniqueness evaluator 105 are provided over network 104 to user devices 102, or to a system administrator, information technology (IT) manager, or other authorized personnel via one or more host agents. Such host agents may be implemented via the user devices 102 or by other computing or processing devices associated with a system administrator, IT manager or other authorized personnel. Such devices can illustratively comprise mobile telephones, laptop computers, tablet computers, desktop computers, or other types of computers or processing devices configured for communication over network 104 with the information uniqueness evaluator 105. For example, a given host agent may comprise a mobile telephone equipped with a mobile application configured to receive alerts from the information uniqueness evaluator 105 or a remediation system (not shown) and to provide an interface for the host agent to select particular remedial measures for responding to the alert or notification. Examples of such remedial measures may include blocking access by one or more of the user devices 102 to the enterprise system or assets thereof, requiring user input or authentication by the user devices 102 to obtain information from or otherwise utilize one or more resources or assets of the enterprise system, triggering further review of the enterprise system or resources or assets thereof, etc. Further examples of remedial measures or actions will be described below.

It should be noted that a "host agent" as this term is generally used herein may comprise an automated entity, such as a software entity running on a processing device. Accordingly, a host agent need not be a human entity.

The particular processing operations and other network functionality described in conjunction with the flow diagram of FIG. 4 are presented by way of illustrative example only, and should not be construed as limiting the scope of the disclosure in any way. Alternative embodiments can use other types of processing operations to assess a uniqueness of information using the disclosed string-based collection frequency techniques. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

In some embodiments, the disclosed techniques for assessing uniqueness of information using string-based collection frequency allow information that is unique and potentially important and/or sensitive to be identified for a given entity. Among other benefits, in one or more embodiments, the disclosed string-based collection frequency techniques evaluate the collection frequency of strings in collections of documents evaluated using multiple collection levels.

One or more embodiments of the disclosure provide improved methods, apparatus and computer program products for assessing uniqueness of information using the disclosed string-based collection frequency techniques. The foregoing applications and associated embodiments should be considered as illustrative only, and numerous other embodiments can be configured using the techniques disclosed herein, in a wide variety of different applications.

It should also be understood that the disclosed string-based collection frequency techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for assessing uniqueness of information using the disclosed string-based collection frequency techniques may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based string-based collection frequency assessment engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based string-based collection frequency assessment platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. These platforms may also be used to implement at least portions of other information processing systems in other embodiments.

Figure 5:
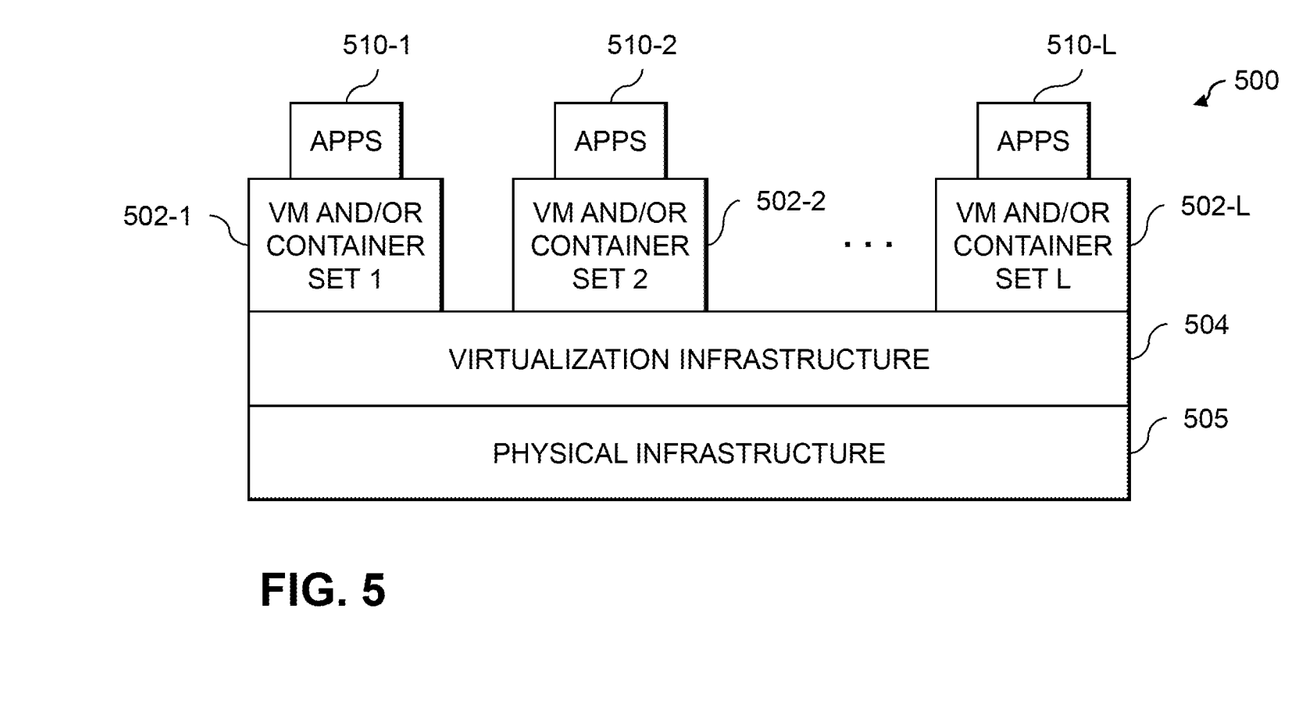
FIG. 5 illustrates an exemplary processing platform that may be used to implement at least a portion of one or more embodiments of the disclosure comprising a cloud infrastructure.

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide string-based collection frequency assessment functionality of the type described above for one or more processes running on a given one of the VMs. For example, each of the VMs can implement information uniqueness assessment control logic and associated string-based collection frequency calculation techniques for providing information uniqueness assessment functionality for one or more processes running on that particular VM.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can provide string-based collection frequency assessment functionality of the type described above for one or more processes running on different ones of the containers. For example, a container host device supporting multiple containers of one or more container sets can implement one or more instances information uniqueness assessment control logic and associated string-based collection frequency calculation techniques for use in assessing information uniqueness.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises at least a portion of the given system and includes a plurality of processing devices, denoted 602-1, 602-2, 602-3, . . . 602-K, which communicate with one another over a network 604. The network 604 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 602-1 in the processing platform 600 comprises a processor 610 coupled to a memory 612. The processor 610 may comprise a microprocessor, a microcontroller, an application specific integrated circuit (ASIC), a field programmable gate array (FPGA) or other type of processing circuitry, as well as portions or combinations of such circuitry elements, and the memory 612, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and the given system may include additional or alternative processing platforms, as well as numerous distinct processing platforms in any combination, with each such platform comprising one or more computers, storage devices or other processing devices.

Figure 6:
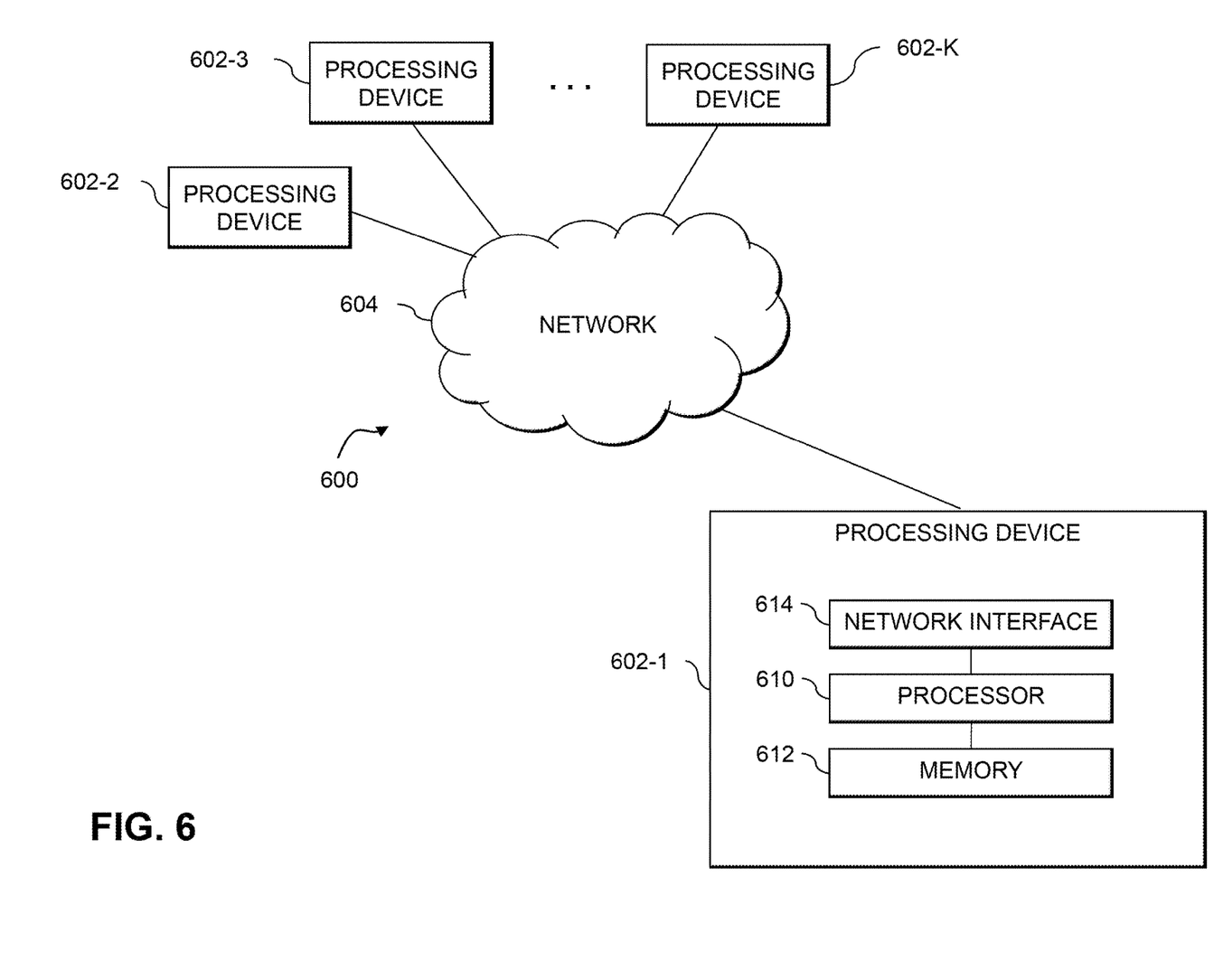
FIG. 6 illustrates another exemplary processing platform that may be used to implement at least a portion of one or more embodiments of the disclosure.

Multiple elements of an information processing system may be collectively implemented on a common processing platform of the type shown in FIG. 5 or 6, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
obtaining a plurality of documents from at least one data source;
evaluating the plurality of documents for a given level, of a plurality of levels, to identify a plurality of collections of documents, wherein the given level is a level of interest to a given user;
determining a collection frequency, within the given level, for a given character string based at least in part on: (i) a number of the collections of documents within the given level comprising the given character string, wherein an existence of the given character string in one or more of the collections of documents, of the plurality of collections of documents, within the given level has a count of one for each collection of documents comprising one or more instances of the given character string, relative to (ii) a total number of the collections of documents within the given level in the plurality of collections;

assigning a uniqueness rating to the given character string for the given level based at least in part on a comparison of: (a) the collection frequency of the given character string within the given level, to (b) a collection frequency of one or more additional character strings within the given level in one or more of the plurality of collections; and performing at least one automated action using the given character string based at least in part on the assigned uniqueness rating;

wherein the method is performed by at least one processing device comprising a processor coupled to a memory.

2. The method of claim 1, wherein the at least one automated action comprises protecting the given character string.

3. The method of claim 2, wherein the protecting the given character string comprises one or more of: (i) anonymizing the given character string in response to the given character string satisfying one or more uniqueness criteria, and (ii) preventing a disclosure of the given character string in response to the given character string satisfying one or more uniqueness criteria.

4. The method of claim 1, wherein the at least one automated action comprises identifying the given character string as important information satisfying one or more importance criteria.

5. The method of claim 1, wherein the uniqueness rating is determined for one or more of the plurality of levels of the collections of documents.

6. The method of claim 1, wherein the uniqueness rating of the given character string is assessed by ranking the collection frequency of the given character string and the collection frequency of the one or more additional character strings in one or more of the plurality of collections of documents.

7. The method of claim 1, wherein the plurality of levels comprises two or more of a company level, a region level, a system level, a sub-system level and a component level.

8. An apparatus comprising:
at least one processing device comprising a processor coupled to a memory;
the at least one processing device being configured to implement the following steps:
obtaining a plurality of documents from at least one data source;
evaluating the plurality of documents for a given level, of a plurality of levels, to identify a plurality of collections of documents, wherein the given level is a level of interest to a given user;
determining a collection frequency, within the given level, for a given character string based at least in part on: (i) a number of the collections of documents within the given level comprising the given character string, wherein an existence of the given character string in one or more of the collections of documents, of the plurality of collections of documents, within the given level has a count of one for each collection of documents comprising one or more instances of the given character string, relative to (ii) a total number of the collections of documents within the given level in the plurality of collections;

assigning a uniqueness rating to the given character string for the given level based at least in part on a comparison of: (a) the collection frequency of the given character string within the given level, to (b) a collection frequency of one or more additional character strings within the given level in one or more of the plurality of collections; and performing at least one automated action using the given character string based at least in part on the assigned uniqueness rating.

9. The apparatus of claim 8, wherein the at least one automated action comprises protecting the given character string.

10. The apparatus of claim 9, wherein the protecting the given character string comprises one or more of: (i) anonymizing the given character string in response to the given character string satisfying one or more uniqueness criteria, and (ii) preventing a disclosure of the given character string in response to the given character string satisfying one or more uniqueness criteria.

11. The apparatus of claim 8, wherein the at least one automated action comprises identifying the given character string as important information satisfying one or more importance criteria.

12. The apparatus of claim 8, wherein the uniqueness rating is determined for one or more of the plurality of levels of the collections of documents.

13. The apparatus of claim 8, wherein the uniqueness rating of the given character string is assessed by ranking the collection frequency of the given character string and the collection frequency of the one or more additional character strings in one or more of the plurality of collections of documents.

14. The apparatus of claim 8, wherein the plurality of levels comprises two or more of a company level, a region level, a system level, a sub-system level and a component level.

15. A non-transitory processor-readable storage medium having stored therein program code of one or more software programs, wherein the program code when executed by at least one processing device causes the at least one processing device to perform the following steps:
obtaining a plurality of documents from at least one data source;
evaluating the plurality of documents for a given level, of a plurality of levels, to identify a plurality of collections of documents, wherein the given level is a level of interest to a given user;
determining a collection frequency, within the given level, for a given character string based at least in part on: (i) a number of the collections of documents within the given level comprising the given character string, wherein an existence of the given character string in one or more of the collections of documents, of the plurality of collections of documents, within the given level has a count of one for each collection of documents comprising one or more instances of the given character string, relative to (ii) a total number of the collections of documents within the given level in the plurality of collections;

assigning a uniqueness rating to the given character string for the given level based at least in part on a comparison of: (a) the collection frequency of the given character string within the given level, to (b) a collection frequency of one or more additional character strings within the given level in one or more of the plurality of collections; and performing at least one automated action using the given character string based at least in part on the assigned uniqueness rating.

16. The non-transitory processor-readable storage medium of claim 15, wherein the at least one automated action comprises protecting the given character string.

17. The non-transitory processor-readable storage medium of claim 16, wherein the protecting the given character string comprises one or more of: (i) anonymizing the given character string in response to the given character string satisfying one or more uniqueness criteria, and (ii) preventing a disclosure of the given character string in response to the given character string satisfying one or more uniqueness criteria.

18. The non-transitory processor-readable storage medium of claim 15, wherein the at least one automated action comprises identifying the given character string as important information satisfying one or more importance criteria.

19. The non-transitory processor-readable storage medium of claim 15, wherein the uniqueness rating is determined for one or more of the plurality of levels of the collections of documents.

20. The non-transitory processor-readable storage medium of claim 15, wherein the uniqueness rating of the given character string is assessed by ranking the collection frequency of the given character string and the collection frequency of the one or more additional character strings in one or more of the plurality of collections of documents.

* * * * *